Patented Apr. 18, 1933

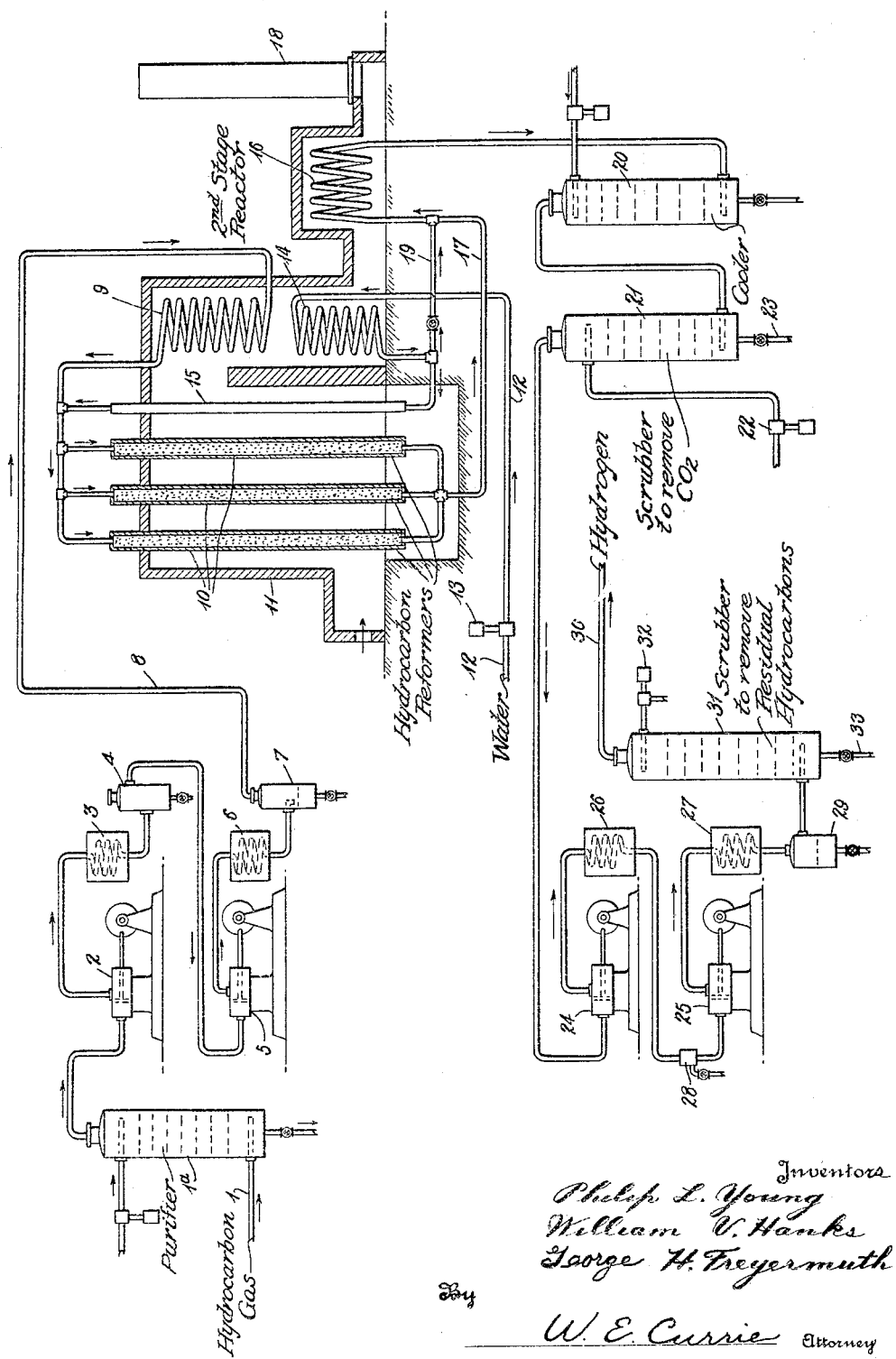

1,904,592

UNITED STATES PATENT OFFICE

PHILIP L. YOUNG, OF NEW YORK, N. Y., AND WILLIAM V. HANKS AND GEORGE H. FREYERMUTH, OF BATON ROUGE, LOUISIANA, ASSIGNORS TO STANDARD OIL DEVELOPMENT COMPANY, A CORPORATION OF DELAWARE

PROCESS FOR THE MANUFACTURE OF HYDROGEN

Application filed August 30, 1929. Serial No. 389,340.

The present invention relates to the art of preparing gas rich in free hydrogen and more specifically comprises an improved process for the manufacture of hydrogen gas for use under high pressure. The invention will be fully understood from the following description and the drawing which illustrates one form of apparatus suitable for the purpose.

The drawing is a semi-diagrammatic view in sectional elevation of an apparatus constructed according to the present invention and indicating the flow of materials.

In the arts it has become highly desirable to produce high pressure hydrogen or gas mixture containing hydrogen and nitrogen, for example for ammonia manufacture or the like. The present process comprises a method for cheaply producing hydrogen under high pressure or mixtures of hydrogen and other gases such as nitrogen, carbon monoxide or carbon dioxide under pressures in considerable excess of atmospheric pressure, for example in excess of 20 or 100 or 200 atmospheres or higher. The advantages of the present method will be apparent to those skilled in the art.

The drawing is a diagram in partial sectional elevation of an apparatus suitable for one method of conducting our invention, and indicates the flow of materials. Briefly, purified hydrocarbons are passed at a pressure in excess of atmospheric with added steam over a suitable catalyst in a "hydrocarbon reformer," where the hydrocarbons are converted into hydrogen, carbon monoxide and carbon dioxide, with the oxides of carbon in varying proportions according to the operating conditions used. A second stage reactor is provided for controlling the concentration of carbon monoxide, where desirable, and the gas is then cooled, purified and compressed according to the use for which it is intended. The legends on the drawing indicate the preferred method of operation when substantially pure hydrogen is to be produced from gaseous hydrocarbons.

Referring to the drawing reference numeral 1 indicates a low pressure feed line supplying a gas rich in hydrocarbon constituents, such as natural gas, oil gas, cracked gas, coal gas or the like which has been substantially freed of sulphur by any suitable means, such as a caustic wash in tower $1^a$ or otherwise. Numeral 2 indicates a compressor which compresses the gas to a higher pressure and the compressed gas is cooled in cooler 3. Condensate may be trapped out in drum 4 and if desired the gas may be compressed to a higher degree in compressor 5 which may, of course, be a second stage of compressor 2. Gas is again cooled in cooler 6 and condensate again separated in drum 7. The compressed gas then flows by line 8 to a preheating coil 9 and thence to a pipe or plurality of pipes 10 arranged preferably vertically in a furnace setting 11. Water is forced through pipe 12 by pump 13 and into a vaporizing coil 14 which may be located with preheating coil 9 in setting 11 so as to be swept by the furnace gases which have passed over pipes 10. Steam formed in pipe coil 14 may be superheated in pipe 15, preferably mounted with pipes 10, and the superheated steam is mixed with the hydrocarbon before passage through pipes 10. These pipes are preferably filled with a suitable catalytic material, the nature of which will be disclosed below.

In pipes 10 steam and hydrocarbons react to form hydrogen and carbon oxides, chiefly carbon monoxide, and the converted gas mixture flows to a second reaction chamber 16 by way of pipes 17. Reaction chamber 16 may be located so as to be kept at an elevated temperature by the gases from setting 11 on their way to stack 18. The reaction chamber preferably comprises a plurality of pipes filled with a catalyst capable of converting one oxide of carbon to the other, depending on the temperature, as will be understood.

If it is desired to make a gas rich in hydrogen and carbon dioxide, or pure hydrogen, the secondary reactor is at a relatively low temperature, say 500° to 850° F., but if it is desired to produce a hydrogen and carbon monoxide mixture, the reactor 16 is held at a high temperature, say 1500° F. or higher. Excess steam may be added to reactor 16 from coil 14 by means of valved line 19.

The secondary reaction chamber 16 is used only for regulating the concentrations of carbon monoxide and carbon dioxide in the final gas, and this chamber may, of course, be omitted when the composition of the gas from the primary reaction zone, "hydrocarbon reformers", indicated by pipes 10 is satisfactory.

The gas is then rapidly cooled in cooler 20 which may be in the form of a spray tower and after cooling is scrubbed in tower 21 with water or alkali under high pressure, to remove carbon dioxide, if desired. The scrubbing fluid is added by means of pump 22 and the liquid charged with carbon dioxide is removed by line 23 to the sewer or otherwise. The cooled purified gas comprising hydrogen with more or less carbon monoxide, nitrogen, carbon dioxide and hydrocarbon constituents, may be further purified, if desired, and may be fed to additional compressors 24 and 25 capable of compressing the gas to any desired pressure. Intercoolers 26 and 27 and drip tanks or drums 28 and 29 may be provided and the gas is delievered at a higher pressure of say 100 or 200 atmospheres or even higher, if desired, to the point of its use by line 30. The unconverted hydrocarbon gas may be removed by scrubbing with oil under full pressure in tower 31, if desired. The oil is supplied by a line 32 and removed by pipe 33.

In the operation of the present process it has been found that substantial economies can be made by the conversion of methane or other hydrocarbons, either normally gaseous or liquid, with steam to hydrogen and carbon monoxide. The gas or liquid hydrocarbon is first freed of sulphurous and other catalytic poisons and is then compressed to a pressure substantially in excess of atmospheric. It is then preheated and mixed with steam and caused to flow over a suitable catalyst packed into a retort which may be heated in any preferred manner, as externally, as shown above or internally by regulated amounts of oxygen or air. It is preferable to use relatively higher temperatures with relatively higher pressure but care must be taken not to exceed the strength of the retort tubes which decreases at relatively higher temperatures. Temperatures are preferably over about 1000° F. and below about 1500° F. and alloy steel tubes, such as iron-chromium tubes are preferred. Pressures from 10 to 50 atmospheres are the most desirable although higher or lower pressures may, of course, be used.

At relatively low temperatures carbon dioxide is formed rather than carbon monoxide. As stated above, it is preferable to use relatively higher temperatures for higher pressures so as to offset a tendency of pressure to reduce the conversion of the hydrocarbon; and the conversion of methane or other hydrocarbon can also be increased by increasing the ratio of steam to methane in the incoming mixture. An excess of steam over the quantity required by the following reaction is required for satisfactory operation:

$$CH_4 + 2H_2O - CO_2 + 4H_2$$

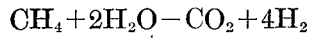

This use of increased reaction temperatures or steam-methane ratios above those necessary for conducting the reaction at atmospheric pressure is indicated in the claims by the term "compensatory condition". It is understood that this term is to be limited to the use of such increased temperatures or steam-methane ratios to offset the adverse effect of pressure.

The catalysts used in the first conversion stage are preferably metal oxides such as nickel or cobalt oxides and these may be mixed with alumina or thoria or other oxides such as rare earths. The catalyst may be supported on refractory support or placed in the retort in lump form.

The second stage of my process is for conversion of one oxide of carbon into the other and the temperature is regulated to this end. For example, when pure hydrogen is desired it is most simply obtained according to this invention by converting the carbon monoxide in the gas from the hydrocarbon reformers into carbon dioxide, and the total carbon dioxide is then subsequently removed by absorption or other suitable means. To prepare a mixture of hydrogen and carbon dioxide, or pure hydrogen, as indicated, the second stage reactor is maintained at a low temperature of say 700° to 850° F., or lower. But if a mixture consisting mainly of hydrogen and carbon monoxide is desired the temperature is higher, say from 1100° to 1400° F., in order to reverse the reaction of carbon monoxide with steam to produce hydrogen and carbon dioxide, which occurs to some extent in the hydrocarbon reformers. In this stage a catalyst such as iron oxide, iron-chromium or the like may be used. Excess steam is preferably added for conversion of CO to $CO_2$.

The carbon dioxide may be removed by scrubbing with water or soda under pressure and the gas may be compressed further to any degree desired. On account of the fact that steel tubes are not safe above 1300° or 1500° F. under high pressure, it is preferred to carry out the conversion at pressures not over 40 atmospheres and to further compress to any higher pressure desired, but the conversion may be accomplished at higher pressures in special retorts designed for these extremely severe conditions.

The drawing illustrates particularly an apparatus for production of pure hydrogen but if mixtures of nitrogen and hydrogen are desired air may be admitted along with steam and hydrocarbon to retorts 10 and the oxygen furnishes sufficient heat to carry out the reaction, leaving nitrogen in the outlet gas. The outlet gas my be scrubbed with oil under pressure to remove unconverted hydrocarbon but under the preferred conditions this is not necessary and the hydrocarbon content of the exit gas can be reduced to below 2%.

Steam may be directly supplied from ordinary plant boilers, if the pressure is sufficiently high, but it is preferable to generate the steam at the plant by pumping water through a vaporizing coil as shown.

The present invention is not to be limited by any theory of the mechanism of the process nor by any particular example of its use which may have been given merely for illustrative purposes. Apparatus widely different from that disclosed may be used, although that shown is preferred. The invention is to be limited only by the following claims in which it is desired to claim all novelty inherent in the process.

We claim:

1. An improved process for the production of a gas rich in free hydrogen under pressure in excess of atmospheric, which comprises continuously passing a hydrocarbon under pressure in excess of atmospheric pressure with steam through a catalytic zone containing a fixed catalyst incapable of absorbing carbon dioxide maintained at a temperature in excess of about 1000° F. using an increased excess of steam above that required at atmospheric pressure whereby the retarding effect of pressure on the reaction is minimized.

2. Process according to claim 1 in which the temperature is between the approximate limits of 1000° and 1500° F.

3. Process according to claim 1 in which the pressure is in excess of about 10 atmospheres.

4. Process in accordance with claim 1 in which the temperature is between about 1000° and 1500° F. and pressure between the limits of 10 and 50 atmospheres.

5. An improved process for the production of a gas rich in free hydrogen under high pressure, comprising continuously passing a hydrocarbon substantially freed of catalyst poisons in admixture with steam in sufficient excess to offset the adverse effect of pressure through a suitable catalytic zone containing a fixed catalyst incapable of absorbing carbon dioxide maintained at a temperature in excess of 1000° F. and at an intermediate pressure in excess of atmospheric pressure, withdrawing the gas comprising hydrogen and compressing a part of such gas to a higher pressure.

6. Process according to claim 5 in which the intermediate pressure is between the approximate limits of 10 and 50 atmospheres.

7. An improved process for producing a gas rich in free hydrogen under pressure substantially in excess of atmospheric pressure, comprising passing a hydrocarbon in gaseous phase and admixed with steam in sufficient excess to offset the adverse effect of pressure over a suitable catalyst incapable of absorbing carbon dioxide maintained at a temperature in excess of 1000° F., and at pressure in substantial excess of atmospheric pressure, passing the gas mixture so produced over a second catalyst at a lower temperature, and cooling the gas mixture.

8. Process according to claim 7 in which additional steam is added to the gas mixture just prior to passage over the second catalyst.

9. Process according to claim 7 in which the cooled gas mixture is scrubbed with water under pressure to remove carbon dioxide.

10. Process according to claim 7 in which carbon dioxide is removed from the cooled gas and the residual gas is compressed to a higher pressure.

11. Process according to claim 7 in which the second catalyst is maintained at a temperature from about 500 to 900° F.

12. Process according to claim 7 in which the cooled gas mixture is scrubbed with appropriate solvents for removal of carbon dioxide and unconverted hydrocarbon respectively.

13. Process according to claim 7 in which the cooled gas mixture is scrubbed with an aqueous solvent to remove carbon dioxide, the residual gas is compressed to a higher pressure and then scrubbed with hydrocarbon oil for removal of hydrocarbon constituents.

14. Process according to claim 1 in which gases containing free oxygen are admitted to the catalytic zone.

15. An improved process for the production of a gas rich in free hydrogen under pressure in excess of atmospheric, which comprises continuously passing a hydrocarbon under pressure in excess of atmospheric pressure with steam through a catalytic zone containing a fixed catalyst incapable of absorbing carbon dioxide at a temperature above 1000° F. in which conversion of methane to hydrogen and oxides of carbon takes place with increase of gaseous volume, and counteracting the adverse equilibrium effect of pressure by imposing a compensatory condition.

16. Process according to claim 15 in which increased temperatures above those necessary at atmospheric pressure are used to compensate for the adverse equilibrium effect of pressure.

17. An improved process for the production of a gas rich in free hydrogen under pressure in excess of atmospheric, which comprises compressing a gaseous hydrocarbon to an elevated pressure, continuously passing said hydrocarbon in admixture with steam through a catalytic zone containing a fixed catalyst incapable of absorbing carbon dioxide at a temperature above 1000° F. in which conversion of the hydrocarbon to hydrogen and oxides of carbon takes place with increases of gaseous volume, and counteracting the adverse equilibrium effect of pressure by imposing a compensatory condition.

PHILIP L. YOUNG.
WILLIAM V. HANKS.
GEORGE H. FREYERMUTH.